United States Patent [19]

Fujinawa et al.

[11] Patent Number: 5,055,308

[45] Date of Patent: Oct. 8, 1991

[54] ACID UREASE PREPARATIONS FOR ALCOHOLIC BEVERAGES

[75] Inventors: Shohei Fujinawa, Himeji; Harumasa Iizuka, Kakogawa; Seiichi Kodama, Nagaokakyo; Hideo Yada, Settsu, all of Japan

[73] Assignee: Takeda Chemical Industries, Ltd., Osaka, Japan

[21] Appl. No.: 435,814

[22] Filed: Nov. 13, 1989

[30] Foreign Application Priority Data

Nov. 10, 1988 [JP] Japan .................................. 63-285561

[51] Int. Cl.$^5$ ......................... C12C 11/00; C12H 1/00; C12G 1/00; C12G 3/00
[52] U.S. Cl. ......................................... 426/11; 426/12; 426/15; 426/16; 426/63; 426/592
[58] Field of Search ................... 426/4, 12, 15, 61, 63, 426/16, 592; 435/195, 227

[56] References Cited

U.S. PATENT DOCUMENTS 4,844,911  7/1989  Kakimoto et al. ................... 426/11

FOREIGN PATENT DOCUMENTS 51-128420  11/1976  Japan.
59-104324  6/1984  Japan.

OTHER PUBLICATIONS

Yoshida et al., Patent Abstracts of Japan, vol. 8, No. 218 (C-245) [1655], 10/4/84.

*Primary Examiner*—Marianne Cintins
*Attorney, Agent, or Firm*—Wenderoth, Lind & Ponack

[57] ABSTRACT

A preparation is provided by drying an aqueous medium containing acid urease and dextrin whose dextrose equivalent is not less than 20. Thus obtained preparation can be used in a good workability for degrading or eliminating urea in alcoholic beverages because of a good compatibility in them.

10 Claims, No Drawings

ACID UREASE PREPARATIONS FOR ALCOHOLIC BEVERAGES

FIELD OF THE INVENTION

This invention relates to acid urease preparations for alcoholic beverages.

BACKGROUND OF THE INVENTION

Heretofore, in producing enzyme compositions for use in foodstuff, in the case of enzymes derived from microorganisms, it is usual to dry them principally for the convenience of distribution, because enzymes obtained by subjecting the fermentation broth to refining process are in such states as solution (e.g.: extracellular enzyme), suspension (e.g.: intracellular enzyme), wet precipitates (e.g.: precipitates obtained by subjecting those in a solvent to filtration), wet sediments (e.g.: those obtained by subjecting salted-out matter to centrifuge), etc. As the drying process, use is usually made of spray-drying or freeze-drying, vacuum-drying, etc. Drying process is, depending on cases, conducted in the co-presence of an excipient, and its object is to stabilize the enzyme or to improve the convenience of handling by enlarging the volume [c.f. Japanese Published examined patent application (Tokkyo Koho) 63-31446, Stable Urease Compositions or Japanese Published unexamined patent application (Kokai tokkyo koho) 59-104324].

OBJECTS OF THE INVENTION

When such a dry enzyme is added to food, the enzymatic action displayed may at times be at odds with the action manifested by the corresponding wet enzyme. This phenomenon is liable to take place particularly when the substrate food is half-aqueous (e.g.: sake and other alcoholic beverages).

In the case of, for example, acid urease to be used for brewing, when a urease suspension (A), spray-dried powder thereof (B) and freeze-dried powder thereof (C) were each added, at the same activity level, to sake, and the respective urea-decomposing activities in sake were compared, the order of the action was: addition of (A)≧addition of an aqueous dispersion of (B) or (C)≧addition of a dispersion of (B) or (C) in sake, thus showing differences in degradation of the substrate. In the above experiment, because of the low levels of addition, the acid urease was first dispersed in water or sake.

In other words, drying of an enzyme used in foodstuff make the enzyme less compatible with the substrate food, thus inhibiting the implementation of enzymatic action, which is a problematic point.

For avoiding this problem, in the use of enzymic composition for the brewing, usually, for example, the enzyme is dispersed in water before adding to sake and other alcoholic beverages so that it may be well moistened beforehand, or, when it is dispersed in sake, the mixture is strongly stirred to give it mechanically compatibility with sake and other alcoholic beverages, but, in any case, these processes require troublesome procedure or invite mixing of water, thus being hardly employable practically.

For solving the problem when the dry powder of acid urease is used for the purpose of preserving the quality of alcoholic beverages, the present inventors have studied principally from the viewpoint of selecting an effective excipient, and found that the use of a dextrin having a certain specific property is remarkable effective, then based on this finding, further study has been conducted to accomplish the present invention.

Namely, the main object of the present invention is to provide an acid urease preparation for alcoholic beverages, which is prepared by drying an aqueous solution containing acid urease and dextrin whose dextrose equivalent is not less than 20.

This object as well as other objects and advantages of the present invention will become apparent to those skilled in the art from the following description.

SUMMARY OF THE INVENTION

According to the present invention, there is provided a preparation which is prepared by drying an aqueous solution containing acid urease and dextrin whose dextrose equivalent is not less than 20. The thus obtained preparation, when used for degrading and eliminating urea in alcoholic beverages, has a good dispersibility in them, thus no such additional steps as strong mechanical operation of promoting compatibility or preliminary dispersion in water are necessary.

DETAILED DESCRIPTION OF THE INVENTION

In preferred embodiments of the preparation of the present invention, the content of the dextrin fractions in which the number of glucose residues is not less than 9 is not more than about 15 weight %, and the preparation is further incorporated with a filter aid.

The acid urease usable in the present invention means that whose optimal pH lies in acid region, especially pH 2 to 5.5. Such an acid urease as above is usually produced by culture of strains of microorganisms capable of producing acid urease, for example, by culturing and refining in accordance with the known manners as disclosed in the European Patent Publication No. 0266088 or U.S. Pat. No. 4,844,911 and European Patent Publication No. 0298641 or U.S. patent application Ser. No. 07/217,355.

In other words, acid urease in any form can be used as the starting material of the preparation of this invention, if only it can be added batch-wise to the substrate food, which include intracellular enzyme containing acid urease in cell body or cell fragments, water-soluble extra-cellular enzyme, enzyme refined to a single or several types of protein by various refining processes, etc.

Incidentally, in the case of expressing the activity of acid urease, one unit means the amount of enzyme capable of decomposing urea at 37° C. in a unit time (one minutes) to liberate one micromol of ammonia. Hereinafter, one unit is expressed as 1U.

And, as the dextrin whose dextrose equivalent is not less than 20 in the present invention, use is made of that obtained by hydrolyzing starch by a per se known process. Here, dextrose equivalent (usually abbreviated as DE) is generally used as an index showing the degree of hydrolysis, and the value is determined by measuring the reducing sugar in dextrin and by expressing as percentage of the sugar as glucose relative to the solid portion. In the present invention, use is preferably made of the dextrin whose DE is 20 or more, which contains about 15 weight % or less components whose number of glucose residues is 9 or more. In addition, dextrin, in which the total amount of glucose, maltose and maltotriose is about 50 weight % or less, can be employed more preferably.

The preparation of this invention can be obtained by preparing an aqueous medium containing acid urease and dextrin whose DE is 20 or more, then drying the medium by a suitable process. The aqueous medium includes a state of solution, suspension, wet precipitate or wet sediment and so on.

When the weight ratio of dextrin whose DE is 20 or more to acid urease is about 0.5 or more, the desired effect is implemented, and the optimal weight ratio is usually 1 to 5. In this case, the activity of acid urease mixed in dextrin whose DE is 20 or more is adjusted to about 1 to 50 U per 1 mg of the preparation. Dextrin whose DE is 20 or more and acid urease are dissolved or dispersed in water in such weight ratio as above, and each of the components previously made an aqueous medium may be mixed, or either one which is in the solid state may be added to the other one which is made in the aqueous medium. What is required is that these two components are homogeneously mixed in an aqueous medium.

The volume of water must be such as sufficient for homogeneously dissolving or dispersing dextrin whose DE is 20 or more and acid urease, and a suitable volume satisfying this requirement is added taking into consideration possible affect on the subsequent drying process. For instance, for the system employing 1,000 mL (3,000 U/mL) of liquid acid urease and 390 mg of dextrin whose DE is 20 or more, a suitable volume of water to be used is 1 to 3L. Addition of water in a volume more than the above does not hamper the object of this invention, apart from causing lowering of the drying efficiency.

Thus-prepared aqueous mixture is subjected to drying, and, as the drying method per se, any ones for preparing conventional enzymatic compositions may be employed, so long as the method is conducted under such conditions as maintaining the activity of acid urease. For example, spray-drying, freeze-drying or vacuum-drying under warming, etc. can be advantageously employed. Thus-dried enzymatic compositions obtained by, for example, freeze-drying or vacuum-drying under warming may be granulated by, among others, crushing and sieving.

Further, incorporation of thus-obtained preparation and a filter aid serves to increase the volume, to improve the dispersibility in alcoholic beverages and to suspend homogeneously in alcoholic beverages within a relatively short period of time, thus being advantageous from the viewpoint of workability.

As the filter aid referred to herein, there is mentioned one which is usually employed for increasing the filtering effect in the filtration step of the production of alcoholic beverages. For example, mineral filter aids such as diatomaceous earth, natural plant fiber such as pulp short fiber (cellulose powder), linter pulp, etc., natural animal fiber such as silk short fiber, etc., synthetic fiber such as polyethylene short fiber, etc., among others, can be used singly or in a mixture of two or more kinds of them. The particle size or fiber length of these filter aids are: in the case of a mineral filter aid such as diatomaceous earth, the particle size ranges from 2 to 20 $\mu$m; in the case of cellulose powder, the fiber length ranges from 0.05 to 1 mm; in the case of linter pulp, the fiber length ranges from 0.2 to 5 mm; in the case of silk short fiber, the fiber length ranges from 0.1 to 10 mm; and, in the case of polyethylene short fiber, the fiber length ranges from 0.3 to 3 mm, and these can be employed in general.

Among these filter aids, cellulose powder has a good miscibility with the above-mentioned acid urease compositions, and, besides, when the compositions thus obtained are subjected to vibration during transportation, classification of components of the compositions hardly occur, thus pulp fiber is of most practical advantage.

As the cellulose powder, use is made of a one prepared by a per se known method by mineral acids. For example, refined wood pulp is depolymerized partially, which is refined, followed by mechanical crushing thereof. Cellulose powder is preferably such as having a particle size of 50 mesh sieve pass and having a fiber length of 150 $\mu$m or less. As such cellulose powder as above, use is made of ones which are commercially available, as exemplified by KC Flock W-50 (containing 90% or more 50 mesh pass particles), KC Flock W-100 (containing 90% or more 100 mesh pass particles) or KC Flock W-200 (containing 90% or more 200 mesh pass particles) (these are all marketed by Takeda Chemical Industries, Ltd., Japan)

The linter pulp employable in this invention is preferably one having 98% or more $\alpha$-cellulose content and 20 to 70 beating degree. This linter pulp is prepared by subjecting linter pulp obtained from cotton seeds to digestion and bleaching, then to beating so that the $\alpha$-cellulose content may be 98% or more and the beating degree may be within the range from 20 to 70. The length of this linter pulp is preferably 1.5 mm, especially 1mm or less.

In the present invention, activated carbon for sake brewing may be used together with a filter aid, and, as the activated carbon, use is made of a one prepared for food use from plant materials (e.g. wood, wood flour, carbonized wood, charcoal, fruit shell, lignin, etc.) and mineral materials (e.g. coal, coal coke, petroleum coke, pitch, etc.). And, activated carbon is classified, from the particle size, into powdered activated carbon and granulated one, and, in the present invention, the former is used, the particle size thereof being preferably 100 mesh pass. As the method of producing activated carbon, there are mentioned chemical-activation and gas-activation, and the activated carbon produced by either method can be employed for the purpose of this invention. As practical examples are mentioned commercially available ones such as "Tokusen Shirasagi" (an activated carbon made from wood flour according to zinc chloride-activation), "Tokusei Shirasagi" (an activated carbon made from wood flour according to zinc chloride-activation, highly purified product) and "Shirasagi RM" (an activated carbon made from wood flour of pine according to steam activation) (manufactured by Takeda Chemical Industries, Ltd., Japan). When the activated carbon is co-used, for example for sake-brewing, it is preferable to mix at a ratio of about 10 to 300 weight parts relative to 100 weight parts of a filter aid.

When a filter aid is incorporated into the abovementioned preparation using acid urease and dextrin whose DE is 20 or more, the amount of the filter aid is so adjusted that the activity of the acid urease in the ultimate composition may be about 0.1 to 10 U per 1 mg of the preparation. The incorporation may be conducted with a conventional rotary mixer or a stationary one.

When the stability, etc. of urease are taken into consideration, the moisture content of the preparation of this invention is preferably adjusted to 10% or less.

Alcoholic beverages which are the subjects of the present invention are those containing urea, such as sake, beer, wine, Chinese rice wine, sweet sake, brandy mash, rum mash, whisky mash, spirit (e.g. gin, vodka, tequila, etc.) mash, shochu mash, etc., or intermediate products of them. The preparation of this invention can be used in the filtration step of the production of alcoholic beverages similarly to conventional filter aids, and, at the same time, can attain the purpose of degradation or elimination of urea. Or, it may be used in a suitable step only aiming at degrading or eliminating urea in alcoholic beverages. In the case of refined sake, for example, this preparation may be added to fresh sake, draft sake, stored sake after heating and refined sake before bottling, etc., and the mixture is left standing until urea disappears, followed by filtration by a conventional method. It is advantageous to add this preparation to, among others, fermentation mash, fresh sake, draft sake, stored sake or refined sake before bottling in an amount ranging from about 0.01 to 1,000 U, more preferably ranging from about 0.1 U to 500 U, relative to one liter of the above-mentioned substrate. More concrete manner of using the preparation of this invention is exemplified as follows. In the case of refined sake, this preparation is added, in a suitable step between filtration under compression of fermentation mash and heating, to fresh sake or draft sake so that the content of acid urease may be about 50 U or more, preferably 500 U or more, more preferably 5,000 U or more relative to 5 kiloliters of the fresh sake or draft sake, then the mixture is left standing at about 10° C. to 30° C., followed by conventional steps such as filtration, heating, storage, bottling, etc. For instance, in the case of adding this composition so that the content of urease becomes 130,000 U at 15° C., the mixture is left standing for 3 days, and, in the case of adding this composition so that the content of urease becomes 130,000 U at 5° C., the mixture is left standing for 8 days. During these periods, urea can be degraded.

The preparation of the present invention, when used for degrading and eliminating urea in sake and other alcoholic beverages, has a good dispersibility in the substrate alcoholic beverages, thus no such additional steps as strong mechanical operation of promoting compatibility or preliminary dispersion in water are necessary. In other words, the preparation of this invention performs the degradation of urea satisfactorily just by adding directly to the substrate alcoholic beverages or by adding after dispersing in a portion of the substrate alcoholic beverages. Therefore, this preparation provides a remarkably great convenience when used in the process of alcoholic beverages, as compared with conventional acid urease compositions.

In the following, this invention is illustrated in more concrete manner with Experiments and Examples. In the following, quantitative determination of urea is conducted by using F-kit (urea/ammonia UV method) of Boehringer Mannheim. And, each of $G_1$, $G_2$, $G_3$ or $G_9$ means the number of glucose residue of the ingredient and the content of them is shown by calculating the relative value of the area of each peak of the charts when determined by means of high performance liquid chromatography (HPLC).

EXPERIMENT 1

Spray-dried product of refined acid urease (1,850 U/mL, solid content: 15%) obtained by cultivation of *Lactobacillus fermentum* IFO 14511 after manner disclosed in European Patent Publication No.0266088, after pre-treatment as shown in Table 1, was added to refined sake [commercially available product, provided that the content of ethanol was adjusted to 20% (V/V) and the concentration of urea 30 ppm], and then the mixture was left standing at 10° C., and the amount of urea was measured with the passage of time. The results are shown in Table 1.

TABLE 1

| Pre-treatment | Activity (U/L) | Residual Urea (ppm) | | |
|---|---|---|---|---|
| | | 0 days | 3 days | 7 days |
| (1) Suspension in water | 20 | 30 | 20 | 10 |
| (2) Suspension in sake | 20 | 30 | 24 | 15 |
| (3) Suspension in sake | 20 | 30 | 21 | 11 |
| (4) Control (starting liquid) | 20 | 30 | 20 | 9 |

Pre-treatment
(1): The spray-dried product of refined acid urease was stirred in water with a magnetic stirrer for 5 minutes.
(2): The spray-dried product of refined acid urease was stirred in sake with a magnetic stirrer for 5 minutes.
(3): The spray-dried product of refined acid urease was stirred vigorously in sake with a household mixer for 5 minutes.
(4): The starting liquid of refined acid urease obtained from the culture broth was used directly without spray-drying.

In the pre-treatment in Table 1, the state of spray-dried particles was observed with a microscope and was found that the particles stirred magnetically showed no substantial change in shape, while those stirred with the household mixer were finely crushed leaving no original particle shape.

In other words, in case of an aqueous dispersion, while original shape of the spray-dried particles was maintained, the activity was the strongest; and in case of dispersing in sake, when the original shape is maintained, the effect was lowered, but, when stirred so strong that the original shape was lost, the effect was enhanced, while so enhanced effect was somewhat inferior to that of an aqueous dispersion.

Therefore, acid urease, when spray-dried, becomes less compatible to sake, and, when added to sake without dispersing in water, its activity lowers.

EXPERIMENT 2

An acid urease liquid similar to that of Experiment 1 was spray-dried to give a dried preparation.

On the other hand, in the acid urease liquid was dissolved respectively each ,of dextrin DE ∼(G$_9$ or more=22%, $G_1+G_2+G_3$=18%) and DE 32 (G$_9$ or more=9%, more=9%, $G_1+G_2+G_3$=39%) at twice weight of the solid matter containing in said acid urease liquid, followed by spray-drying. Each of three preparations thus obtained was dispersed in water or in a portion of sake to be tested, which was added to refined sake [commercially available one which was adjusted to contain 20% (V/V) ethanol and 30 ppm of urea], then the respective activities of degrading urea at 10° C. were determined. The results are shown in Table 2.

TABLE 2

Urea degradation constant [k = $-\frac{1}{t}$ ln (Ct/Co), wherein
Ct and Co are urea concentrations at t and 0 days] at 10° C.
Amount of enzyme added: 20 U/L

| | Added after dispersed in water | Added after dispersed in sake |
|---|---|---|
| No dextrin | 0.38 day$^{-1}$ | 0.20 day$^{-1}$ |
| Dextrin of DE 18 | 0.27 day$^{-1}$ | 0.27 day$^{-1}$ |

TABLE 2-continued

| | | |
|---|---|---|
| Dextrin of DE 32 | 0.53 day$^{-1}$ | 0.43 day$^{-1}$ |

As is apparent from Table 2, acid urease powder containing no dextrin becomes less compatible with refined sake, and a large difference occurs between the case of being dispersed in water in advance and the case of being dispersed in sake in advance. In dried acid urease powder containing dextrin of DE 18 as the excipient, the activity is constant irrespective of dispersion methods. However, comparison of an aqueous dispersion of dried acid urease powder containing dextrin of DE 18 as the excipient with that containing no dextrin shows inferior activity of the former to the latter. On the other hand, acid urease powder dried after addition of dextrin of DE 32 is improved in the compatibility with refined sake, and both dispersion in water and that in sake increase the activity remarkably as compared with acid urease powder containing no excipient.

EXPERIMENT 3

An acid urease liquid similar to that of Experiment 1 was spray-dried to give a dried preparation.

On the other hand, in the acid urease solution was dissolved dextrin DE 32 ($G_9$ or more=9%, $G_1+G_2+G_3=39\%$) at twice weight of the solid matter containing in said acid urease solution, followed by spray-drying. Each of two preparations thus obtained was dispersed in water or a portion of Chinese rice wine to be tested, which was added to the Chinese rice wine [Shao Hsing, ethanol content: 17-18% (v/v), urea: 30 ppm] and then the respective activities of degrading urea at 20° C. were determined. The results are shown in Table 3.

TABLE 3

Urea degradation constant [$k = -\frac{1}{t} \ln (Ct/Co)$] at 20° C.

Amount of enzyme added: 28 U/L

| | Added after dispersed in water | Added after dispersed in Chinese rice wine |
|---|---|---|
| No dextrin | 0.22 day$^{-1}$ | 0.18 day$^{-1}$ |
| Dextrin of DE 32 | 0.39 day$^{-1}$ | 0.37 day$^{-1}$ |

As is apparent from Table 3, acid urease powder containing no dextrin becomes less compatible with Chinese rice wine, and a large difference occurs between the case of being dispesed in water in advance and the case of being dispersed in Chinese rice wine in advance.

EXPERIMENT 4

Each of the two preparations obtained in Experiment 3 was dispersed in water or in a portion of white wine to be tested, which was added to the wine [ethanol content: 14% (v/v), urea: 30 ppm], and then the respective activities of degrading urea at 10° C. were determined. The results are shown in Table 4.

TABLE 4

Urea degradation constant [$k = -\frac{1}{t} \ln (Ct/Co)$] at 10° C.

Amount of enzyme added: 100 U/L

| | Added after dispersed in water | Added after dispersed in wine |
|---|---|---|
| No dextrin | 0.29 week$^{-1}$ | 0.26 week$^{-1}$ |
| Dextrin of DE 32 | 0.41 week$^{-1}$ | 0.41 week$^{-1}$ |

As is apparent from Table 4, acid urease powder containing no dextrin becomes less compatible with wine, and a large difference occurs between the case of being dispesed in water in advance and the case of being dispersed in wine in advance.

EXAMPLE 1

The aqueous liquid of refined acid urease 820 mL (1,850 U/mL, solid content 15%)] obtained in a manner similar to Experiment 1 was divided into two portions. The one portion (410 mL) was mixed with 400 ml, of an aqueous solution of 158 g of dextrin of DE 34.5 (Amycol No.3L manufactured by Nichiden Kagaku, Ltd., $G_1+G_2+G_3$ 37%, $G_9$ and more 10%), and the respective preparations were spray-dried. The powder without dextrin was 13.0 U/mg, while the product to which dextrin was added was 3.2 U/mg in acid urease activity.

Ethanol and urea were added to commercial refined sake to adjust the ethanol degree to 20%(V/V) and urea concentration to 30 ppm to prepare model fresh sake, to which was added each of the acid urease compositions prepared above, and urea degradation at 10° C. was examined (Table 5).

TABLE 5

| Dispersion of powder in advance | Addition of the dextrin | Amount of enzyme added (U/L) | Concentration of urea (ppm) | | | |
|---|---|---|---|---|---|---|
| | | | 0 day | 2 days | 3 days | 7 days |
| in water | no | 20 | 30 | 19 | 12 | 3 |
| | yes | 20 | 30 | 13 | 7 | 2> |
| in sake | no | 20 | 30 | 22 | 18 | 10 |
| | yes | 20 | 30 | 14 | 9 | 2> |

In Table 5, an advantage of the dry powder in which dextrin of DE 34.5 was used was shown, especially, in the case of adding to model fresh sake after dispersion in model fresh sake, the excellent effect was remarkable. To reduce the decrease of compatibility with model fresh sake due to drying, which is the object of this invention, is performed by the addition of a specific dextrin, as proved by this Example.

EXAMPLE 2

Two kinds of acid urease preparations prepared in Example 1 were respectively mixed with fine powder of cellulose (KC Flock W-200, manufactured by Sanyo-Kokusaku Pulp Co., Ltd., Japan) to prepare compositions of 1.3U/mg each in acid urease activity. This preparation (385 mg) was suspended in water or refined sake (25 mL). One milliliter of this suspension was added to 1 L of the model fresh sake prepared from two kinds of commercial sake as in a manner similar to Example 1 (the amount added: 1.3U/mg×385 mg/25 mL ×1 mL/L=20U/L), and urea degradation at 10° C. was examined (Table 6).

As shown in Table 6, the preparation according to the present invention, can maintain the effect without receiving any influence, by mixing with cellulose fine powder which is a kind of filter aids.

TABLE 6

| Model fresh sake | Dispersion of powder in advance | Addition of dextrin | Concentration of urea (ppm) | | | | |
|---|---|---|---|---|---|---|---|
| | | | 0 day | 16 hours | 3 days | 4 days | 8 days |
| A | water | no | 29 | 22 | 9 | 6 | 2> |
| | | yes | 29 | 21 | 7 | 4 | 2> |
| | sake | no | 29 | 25 | 16 | 15 | 6 |
| | | yes | 29 | 22 | 8 | 5 | 2> |
| B | water | no | 34 | 20 | 4 | 2 | — |
| | | yes | 34 | 18 | 2 | 2> | — |
| | sake | no | 34 | 27 | 12 | 10 | 3 |
| | | yes | 34 | 20 | 2 | 2> | — |

By the way, the effect of the cellulose fine powder employed in this Example is in improvement of dispersibility of the acid urease in sake.

In other words, while the acid urease preparation prepared by using dextrin of DE 34.5 by the aforedescribed method was suspended in sake, "flocking" phenomenon is sometimes observed, and it takes time to some extent for realizing homogeneous suspension, but when cellulose fine powder is mixed in the composition beforehand, homogenous suspension can be realized instantly, thus serving to provide further advantage in workability (Table 7).

TABLE 7

| Time required for realizing homogeneity in dispersion of preparation mixed with cellulose fine powder/sake | | | | | |
|---|---|---|---|---|---|
| Acid urease preparation with dextrin % (W/W) | 100 | 90 | 80 | 70 | 60 |
| Cellulose fine powder % (W/W) | 0 | 10 | 20 | 30 | 40 |
| Stirring time* | 10 min. | 5 min. | 15 sec. | 10 sec. | 10 sec. |

*Stirring time means a required time to obtain a homogeneous suspension when each preparation (1 g) mentioned above is mixed in sake (25 mL) with a magnetic stirrer.

EXAMPLE 3

To 500 mL each portion of the refined liquid acid urease employed in Example 1 as the starting material was added each of the aqueous solutions of dextrin of DE 24 ($G_9$ or more 5%, $G_1+G_2+G_3=39\%$, Amycol No. 1B), dextrin of DE 16 ($G_9$ or more 24%, $G_1+G_2+G_3=16\%$, Amycol No.1) and dextrin of DE 2.4 ($G_9$ or more 95%, $G_1+G_2+G_3$ 1%, Pinedex 100, product of Matsutani Chemical Industries, Japan), followed by spray-drying to thereby prepare dry powder compositions respectively containing each dextrin.

As in the foregoing Examples, test samples were added to the model fresh sake by 20U/L each, and the activity of degrading urea at 10° C. was examined (Table 8).

TABLE 8

| | | Urea degradation constant $[k = -\frac{1}{t} \ln(C_t/C_o)]$ | | |
|---|---|---|---|---|
| | | (Types of dextrin) | | |
| Dispersion of powder in advance | Activity (U/L) | DE 24 day$^{-1}$ | DE 16 day$^{-1}$ | DE 2.4 day$^{-1}$ |
| in water | 20 | 0.90 | 0.55 | 0.40 |
| in sake | 20 | 0.68 | 0.28 | 0.25 |

As is clear from the Table 8, as the dextrin to be employed in the present invention, that of DE 20 or more is effective, performing a different function from a mere excipient or bulk filler.

EXAMPLE 4

The acid urease preparation mentioned in Example 2 was added, in the process of sake brewing, to fresh sake just after filtration by compression of the mash, and the effect of the present invention was examined (Table 9).

The volume of the fresh sake was 500L, the amount of the acid urease preparation was 10 g (26U/L) each, and the storage temperature was 4° C.

TABLE 9

| Kinds of fresh sake | Ethanol (Sake-meter) | Presence of Dextrin | Urea Content (ppm) | | | | |
|---|---|---|---|---|---|---|---|
| | | | 0 day | 16 hour | 2 day | 3 day | 4 day |
| A | 19.1% (−3.0) | no | 31 | 12 | 11 | 10 | 6 |
| | | yes | 31 | 6 | 4 | 2> | 2> |
| B | 19.5% (−5.0) | no | 42 | 18 | 15 | 13 | 9 |
| | | yes | 42 | 8 | 5 | 2 | 2> |

The preparations of this invention degraded urea in a remarkably less period than the control.

What we claim is:

1. A preparation containing acid urease and dextrin whose dextrose equivalent is not less than 20.
2. The preparation according to claim 1, wherein the content of the dextrin fractions in which the number of glucose residue is not less than 9 is not more than about 15 weight %.
3. The preparation according to claim 1, wherein the dextrin is one in which the total amount of glucose, maltose and maltotriose is about 50 weight % or less.
4. The preparation according to claim 1, wherein the weight ratio of the dextrin to the acid urease is about 0.5 or more.
5. The preparation according to claim 1, which further contains a filter aid.
6. The preparation according to claim 5, wherein the filter aid is one or more members selected from the group consisting of mineral filter aid, natural plant fiber, natural animal fiber and synthetic fiber.
7. The preparation according to claim 6, wherein the natural plant fiber is cellulose powder.
8. The preparation according to claim 7, wherein the cellulose powder is from 0.05 to 1 mm in the fiber length.
9. A method for degrading or eliminating urea in an alcoholic beverage, which comprises mixing a preparation containing acid urease and dextrin whose dextrose equivalent is not less than 20, with the alcoholic beverage.
10. The method according to claim 9, wherein the alcoholic beverage is a member selected from the group consisting of sake, sweet sake, beer, wine, Chinese rice wine, brandy mash, rum mash, whisky mash, sprit mash and shochu mash.

* * * * *